(12) United States Patent
Arimura

(10) Patent No.: US 8,798,676 B2
(45) Date of Patent: Aug. 5, 2014

(54) CARD DEVICE AND MOBILE COMMUNICATION TERMINAL

(75) Inventor: Shogo Arimura, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 12/830,594

(22) Filed: Jul. 6, 2010

(65) Prior Publication Data

US 2011/0014949 A1 Jan. 20, 2011

(30) Foreign Application Priority Data

Jul. 15, 2009 (JP) .................................. 2009-166409

(51) Int. Cl.
*H04B 1/38* (2006.01)
*H04B 1/00* (2006.01)

(52) U.S. Cl.
CPC ..................................... *H04B 1/006* (2013.01)
USPC ..... 455/558; 455/556.1; 455/557; 455/553.1; 455/401; 455/552.1; 375/347; 375/219; 375/267; 375/295; 375/316

(58) Field of Classification Search
CPC .............................. H04B 1/3816; H04W 36/00
USPC ............. 455/558, 401, 78, 82, 101, 134, 135, 455/115.3, 552.1, 553.1, 556.1, 557; 375/347, 219, 267, 295, 316
See application file for complete search history.

(56) References Cited

U.S. PATENT DOCUMENTS

| | | | |
|---|---|---|---|
| 6,560,443 B1 | 5/2003 | Vaisanen et al. | |
| 8,417,205 B2 * | 4/2013 | Tang et al. | 455/272 |
| 2003/0114188 A1 * | 6/2003 | Rousu | 455/553 |
| 2004/0225786 A1 * | 11/2004 | Puupponen et al. | 710/240 |
| 2007/0142001 A1 * | 6/2007 | Sanders | 455/101 |
| 2007/0161404 A1 * | 7/2007 | Yasujima et al. | 455/557 |
| 2008/0076468 A1 * | 3/2008 | Kinney et al. | 455/553.1 |
| 2009/0061791 A1 | 3/2009 | Matsubara | |

FOREIGN PATENT DOCUMENTS

| | | |
|---|---|---|
| JP | 2001-024579 | 1/2001 |
| JP | 2003-347822 | 12/2003 |
| JP | 2006-311396 | 11/2006 |
| JP | 2007-336115 | 12/2007 |
| JP | 2009-060160 | 3/2009 |
| JP | 2009-65254 | 3/2009 |

OTHER PUBLICATIONS

Japanese Office Action mailed Jun. 18, 2013.
Japanese Office Action mailed Apr. 16, 2013.

* cited by examiner

*Primary Examiner* — Amancio Gonzalez
(74) *Attorney, Agent, or Firm* — IPUSA, PLLC

(57) ABSTRACT

A card device that is loaded in a mobile communication terminal and is used for wireless communication, includes a transmission and reception circuit that generates a transmission signal to be transmitted in a wireless manner based on transmission data, and processes a received signal that has been received in the wireless manner; a first antenna that is used for signal transmission and reception in the wireless manner; an antenna terminal that is connected with a second antenna that is provided in the outside of the card device; and a switch that connects in a switching manner one of the first antenna and the antenna terminal to the transmission and reception circuit.

6 Claims, 5 Drawing Sheets

CARD DEVICE AND MOBILE COMMUNICATION TERMINAL

BACKGROUND OF THE INVENTION

1. Field of the Invention

The present invention relates to a card device for wireless communication to be loaded in a mobile communication terminal, and the mobile communication terminal.

2. Description of the Related Art

It is common that, in a mobile communication terminal such as a cellular phone, a wireless communication function such as an infrared transmission/reception function, a Bluetooth (registered trademark) function or such for short distance data transfer, is mounted. Furthermore, it is desired that, in the mobile communication terminal, a wireless LAN (Local Area Network) function for middle distance data transfer be additionally mounted.

In a case where a wireless LAN function is additionally mounted in the mobile communication terminal, a circuit block having a wireless LAN function including an antenna is mounted on a card device such as a microSD card, for example; the card device is thus used as a wireless LAN card, and the wireless LAN card is mounted in the mobile communication terminal.

It is noted that a technique is known in which an antenna for a card device is provided in a mobile communication terminal, and the antenna is connected to the card device in a case where the card device is loaded in the mobile communication terminal (see Japanese Laid-Open Patent Application No. 2009-60160, for example).

A position at which the wireless LAN card is loaded in the mobile communication terminal is different depending on a particular device type of the mobile communication terminal. In the case where the circuit block of the wireless LAN function including the antenna is mounted on the wireless LAN card, there may be a case where the antenna of the wireless LAN card is covered by a user who holds the mobile communication terminal, or the antenna of the wireless LAN card is covered by a battery pack, a circuit substrate or such of the mobile communication terminal. In such a case, sensitivity of the antenna may be degraded, and the wireless LAN function may not be used effectively.

Further, generally speaking, mobile communication carried by the mobile communication terminal may be influenced by multipath. Especially, for a frequency band of 2.4 GHz used by wireless LAN, the influence of multipath may become remarkable.

SUMMARY OF THE INVENTION

The present invention has been devised in consideration of the above-mentioned problems, and an aspect of the present invention is to provide a card device and a mobile communication terminal which can reduce such degradation of antenna sensitivity.

According to an embodiment of the present invention, a card device that is loaded in a mobile communication terminal and is used for wireless communication, includes a transmission and reception circuit that generates a transmission signal to be transmitted in a wireless manner based on transmission data, and processes a received signal that has been received in the wireless manner; a first antenna that is used for signal transmission and reception in the wireless manner; an antenna terminal that is connected with a second antenna that is provided on the outside of the card device; and a switch that connects in a switching manner one of the first antenna and the antenna terminal to the transmission and reception circuit.

BRIEF DESCRIPTION OF THE DRAWINGS

Other objects and further features of the present invention will become more apparent from the following detailed description when read in conjunction with the following accompanying drawings.

DETAILED DESCRIPTION OF THE EMBODIMENTS

Figure 1A:
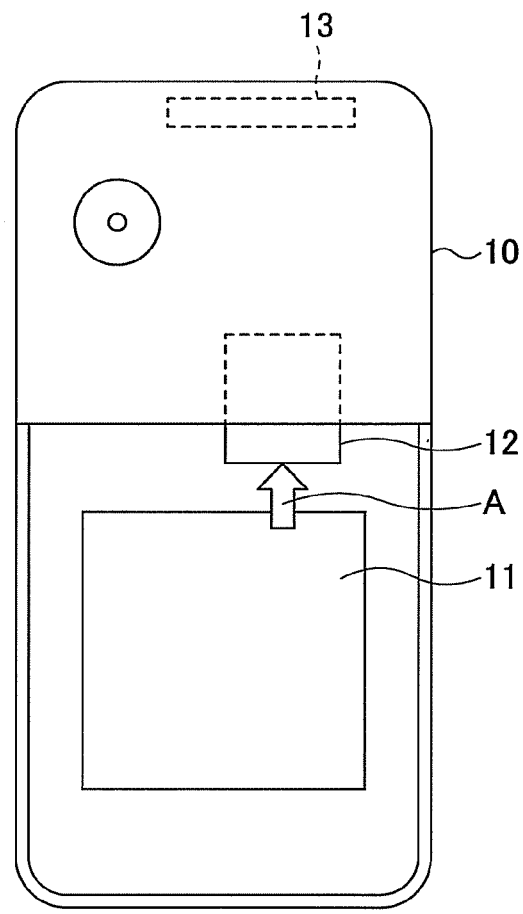
FIG. 1A shows a plan view of a mobile communication terminal.

Embodiments of the present invention will now be described with reference to the figures.

According to an embodiment, a card device (20) that is loaded in a mobile communication terminal (10) and is used for wireless communication, includes a transmission and reception circuit (25) that generates a transmission signal to be transmitted in a wireless manner based on transmission data, and processes a received signal that has been received in the wireless manner; a first antenna (23) that is used for signal transmission and reception in the wireless manner; an antenna terminal (22b) that is connected with a second antenna (13) that is provided in the outside of the card device (20); and a switch (24) that connects in a switching manner one of the first antenna (23) and the antenna terminal (22b) to the transmission and reception circuit (25). It is noted that the term "in a switching manner" means that, in the example of the above-mentioned switch (24), a connection of the transmission and reception circuit (25) is switchable by the switch (24) between with the first antenna (23) and with the antenna terminal (22b).

Preferably, the card device (20) further includes a control part (25) that compares a received signal strength of a signal received by using the first antenna (23) and a received signal strength of a signal received by using the second antenna (13), selects one of the first antenna (23) and the second antenna (13), which one has a greater received signal strength, and causes the switch (24) to connect the first antenna (23) to the transmission and reception circuit (25) when selecting the first antenna (23), and connect the antenna terminal (22b) to the transmission and reception circuit (25) when selecting the second antenna (13).

Further, preferably, in the card device (20), in a condition in which the card device (20) is loaded in the mobile communication terminal (10), the first antenna (23) and the second antenna (13) have a spatial arrangement such that the control part (25) carries out a space diversity method by using the first antenna (23) and the second antenna (13).

Alternatively, preferably, in the card device (20), in a condition in which the card device (20) is loaded in the mobile communication terminal (10), the first antenna (23) and the second antenna (13) have a spatial arrangement such that the control part (25) carries out a polarization diversity method by using the first antenna (23) and the second antenna (13).

According to an embodiment of the present invention, a mobile communication terminal (10), in which a card device (20) that is used for wireless communication of transmitting and receiving a signal having a frequency band is loaded, includes a transmission and reception circuit (15) that generates a transmission signal to be transmitted in a wireless manner based on transmission data, and processes a received signal that has been received in the wireless manner; an antenna (13) that is used for transmitting and receiving a signal having the frequency band in the wireless manner; and a switch (14) that connects the antenna (13) to, in a switching manner, any one of an antenna terminal (22b) of the card device (20), which antenna terminal is connected with a transmission and reception circuit (25) that the card device (20) has, and the transmission and reception circuit (15) of the mobile communication terminal (10). It is noted that the term "in a switching manner" means that, in the example of the above-mentioned switch (14), a connection of the antenna 13 is switchable by the switch (14) between with the antenna terminal (22) and with the transmission and reception circuit (15) of the mobile communication terminal (10).

Preferably, in the mobile communication terminal (10), the switch (14) carries out a switching operation to connect the antenna (13) to, in the switching manner, any one of the antenna terminal (22b) of the card device (20) and the transmission and reception circuit (15) of the mobile communication terminal (10), according to a selecting operation carried out by a user.

It is noted that the reference numerals in the brackets are merely for easy understanding, and are merely for example, and the embodiment of the present invention is not limited to the modes shown in the figures.

According to the embodiment of the present invention, it is possible to reduce degradation of antenna sensitivity.

<Plan Views of Mobile Communication Terminal and Wireless LAN Card>

Figure 1B:
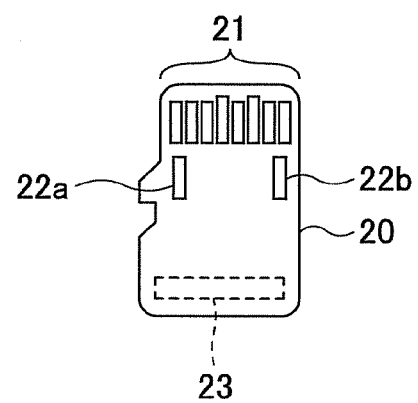
FIG. 1B shows a plan view of a wireless LAN card.

FIGS. 1A and 1B show plan views of a mobile communication terminal 10 and a wireless LAN card 20 in an embodiment of the present invention. FIG. 1A shows a plan view of the mobile communication terminal 10 in the embodiment. FIG. 1A shows a condition in which a rear cover of the mobile communication terminal 10 has been removed. A card device connector 12 is provided, for example, adjacent to a battery pack 11, in the inside of the mobile communication terminal 10. The wireless LAN card 20, acting as a card device, shown in FIG. 1B, is inserted into the card device connector 12 in a direction of an arrow A. The wireless LAN card 20 is detachable from the mobile communication terminal 10.

Further, in the inside of the mobile communication terminal 10, an antenna 13 for 2.5 GHz is provided for Bluetooth (registered trademark) communication. It is noted that, although not shown, an antenna for mobile communication, an antenna for receiving one segment digital terrestrial broadcasting, and so forth, are provided, other than the antenna 13, in the inside of the mobile communication terminal 10.

FIG. 1B shows a plan view of the wireless LAN card 20 acting as a card device. It is noted that, for the sake of convenience for explanation, the wireless LAN card 20 is shown somewhat in a magnified manner, in comparison to the mobile communication terminal 10 shown in FIG. 1A. In the embodiment, a microSD card is used as the wireless LAN card 20. The wireless LAN card 20 has two terminals 22a and 22b, other than 8 terminals 21 according to the microSD card standard. The terminals 21 include one power supply terminal, one ground terminal, four data terminals, one clock terminal and one command terminal. The terminal 22a is a ground terminal and the terminal 22b is an antenna terminal. Further, in the inside of the wireless LAN card 20, an antenna for a 2.4 GHz frequency band is provided for wireless LAN communication.

It is noted that, wireless LAN prescribed by IEEE 802.11b/g that is a wireless LAN standard uses the 2.4 GHz frequency band. Also, Bluetooth (registered trademark) communication uses the same 2.4 GHz frequency band.

Figure 2:
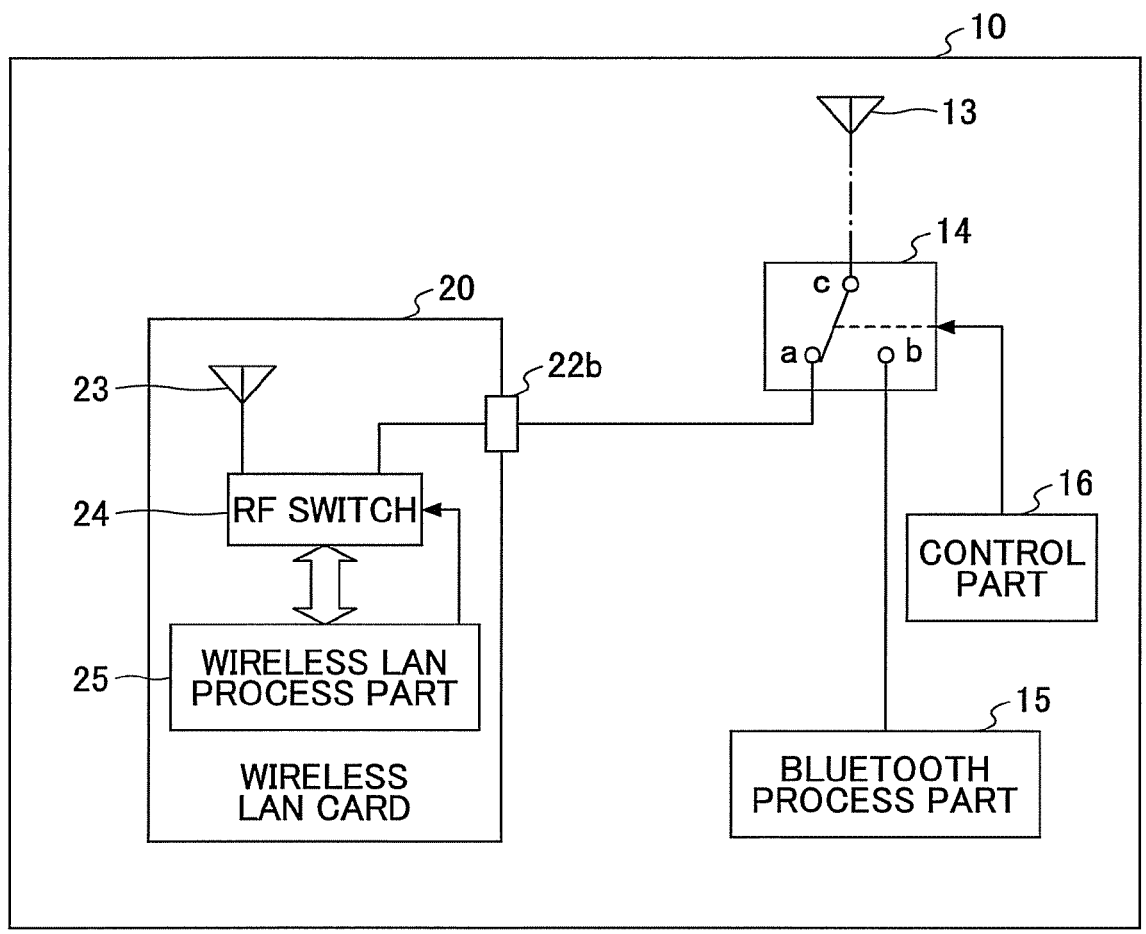
FIG. 2 shows general configurations of the mobile communication terminal and the wireless LAN card.

FIG. 2 shows general configurations of the mobile communication terminal 10 and the wireless LAN card 20. In FIG. 2, in the inside of the wireless LAN card 20, the antenna 23 and the antenna terminal 22b are connected to a RF (Radio Frequency) switch 24, and the RF switch 24 is connected to a wireless LAN process part 25. The RF switch 24 connects any one of the antenna 23 and the antenna terminal 22b to the wireless LAN process part 25 under the control of the wireless LAN process part 25.

The antenna terminal 22b of the wireless LAN card 20 is connected to a terminal "a" of a RF (Radio Frequency) switch 14 of the mobile communication terminal 10. A bluetooth process part 15 is connected to a terminal "b" of the RF switch 14. The antenna 13 is connected to a terminal "c" of the RF switch 14.

A control part 16 of the mobile communication terminal 10 which controls the entirety of the mobile communication terminal 10 controls the RF switch 14 in such a manner that, when a user operates the mobile communication terminal 10 to select a Bluetooth using mode, the terminals "b" and "c" of the RF switch 14 are connected together, and thus, the antenna 13 is connected to the Bluetooth process part 15. Further, the control part 16 controls the RF switch 14 in such a manner that, when a user operates the mobile communication terminal 10 to select a wireless LAN using mode, the terminals "a" and "c" are connected together, and thus, the antenna 13 is connected to the RF switch 24 of the wireless LAN card 20 via the antenna terminal 22b.

It is noted that the wireless LAN process part 25 is connected with the control part 16 of the mobile communication terminal 10 via the terminals 21.

<Configuration of Wireless LAN Card>

Figure 3:
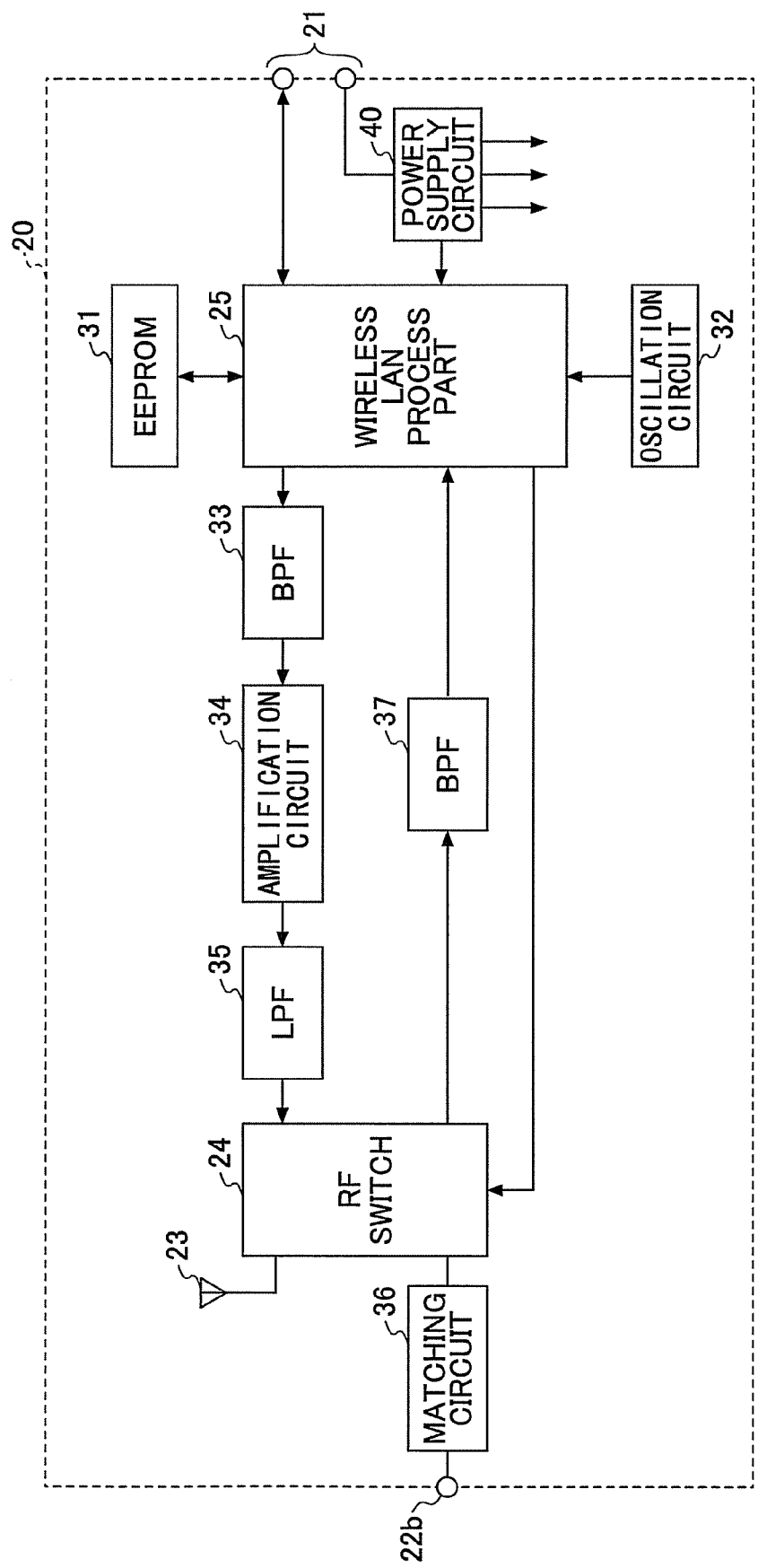
FIG. 3 shows a block configuration of the wireless LAN card.

FIG. 3 shows a block configuration of the wireless LAN card 20. In FIG. 3, the wireless LAN card 25 includes a microprocessor (not shown), and the microprocessor is connected with an EEPROM 31 that is used by the microprocessor as a memory. Further, a clock signal is supplied to the wireless LAN process part 25 from an oscillation circuit 32. Further, in response to an instruction for the wireless LAN using mode given by the control part 16 of the mobile communication terminal 10 via the terminals 21, the wireless LAN process part 25 carries out a process of RF (Radio Frequency) signal processing, a baseband process, a MAC (Media Access Control) process, and so forth, for a transmission signal and for a received signal. Further, the wireless LAN process part 25 carries out switching control of the RF switch 24.

Transmission data supplied from the control part 16 of the mobile communication terminal 10 or such via the terminals 21 undergoes a MAC process, a baseband process and a RF signal processing process carried out by the wireless LAN process part 25 to become a transmission signal, and the transmission signal is supplied to an amplification circuit 34 after being band-limited by a band-pass filter (BPF) 33. The transmission signal is amplified by the amplification circuit 34, an unwanted frequency component is removed from the transmission signal by a low-pass filter (LPF) 35, then the transmission signal is supplied to the RF switch 24, and the transmission signal is transmitted from one of the antenna 23 and the antenna 13, which one is selected by the RF switch 24.

A matching circuit 36 is provided in the wireless LAN card 20 between the terminal 22b, with which the antenna 13 of the mobile communication terminal 10 is connected via the RF switch 14, and the RF switch 24. The matching circuit 36 has, for example, two capacitors (not shown) connected in series between the terminal 22b and the RF switch 24, and an inductor (not shown) connected between a connecting point between the two capacitors and ground, and carries out impedance matching between the RF switch 14 and the RF switch 24.

Further, a signal received by any one of the antenna 13 and the antenna 23 is selected by the RF switch 24, the selected signal is band-limited by a band-pass filter (BPF) 37, and is supplied to the wireless LAN process part 25. The received signal then undergoes a RF signal processing process, a baseband process and a MAC process carried out by the wireless LAN process part 25, and then is supplied to the control part 16 of the mobile communication terminal 10 or such via the terminals 21.

Further, the wireless LAN process part 25 includes a power supply circuit 40. The power supply circuit 40 is supplied with a power supply voltage from the mobile communication terminal 10 via the power supply terminal of the terminals 21, and supplies the power supply voltage to the wireless LAN process part 25.

<Control of Switching of RF Switch>

Figure 4:
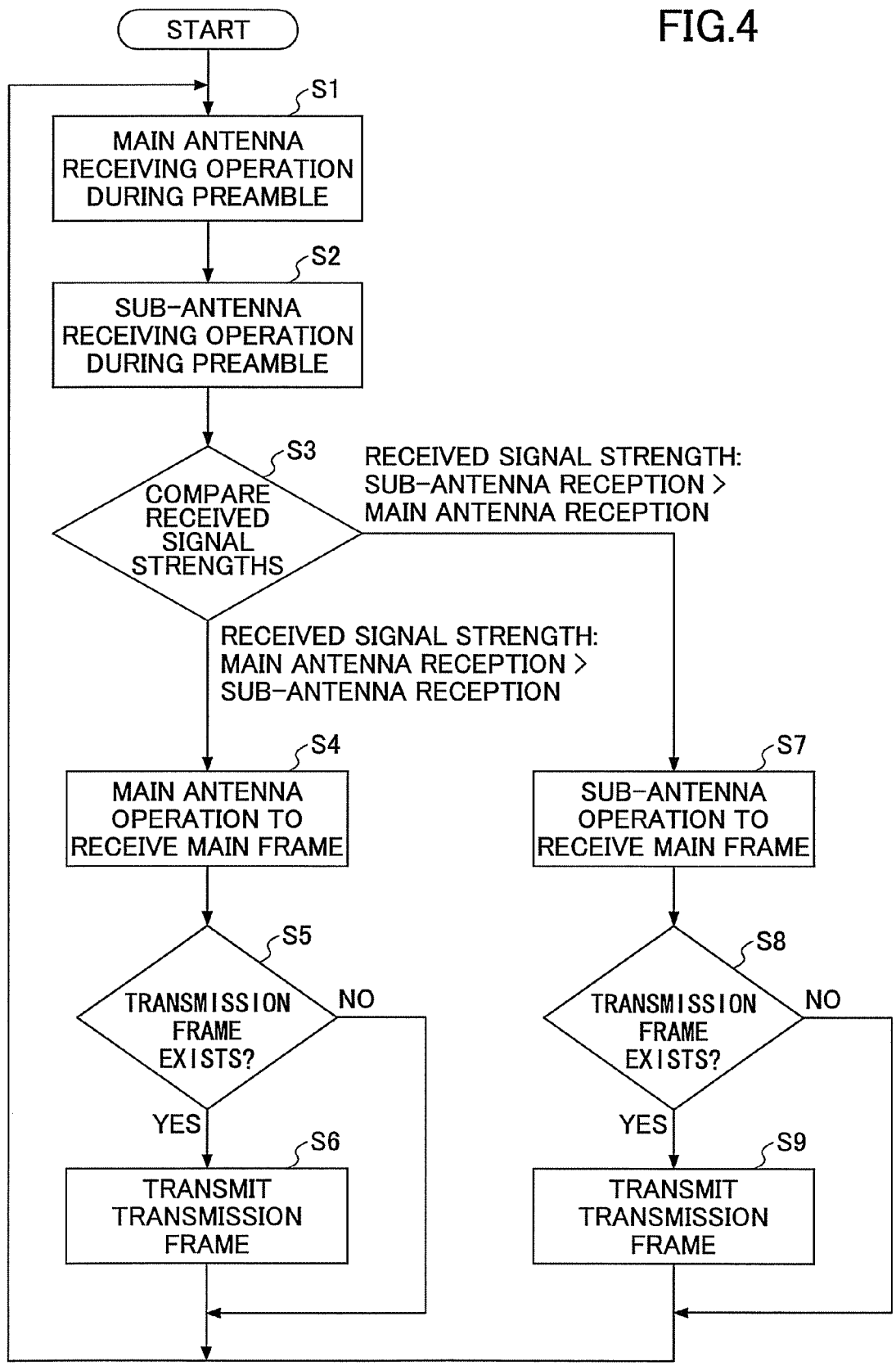
FIG. 4 shows a flowchart of one example of a process of switching control of a RF switch shown in FIGS. 2 and 3.

FIG. 4 shows a flowchart of an operation of switching the RF switch 24 carried out by the wireless LAN process part 25. It is noted that a wireless LAN frame includes a preamble part, a header part and a data part.

In FIG. 4, in step S1, the RF switch 24 is controlled to select the antenna 23 (referred to as a main antenna in FIG. 4) of the wireless LAN card 20 during a preamble period of a wireless LAN frame, and a received signal strength of a signal (the preamble part of the wireless LAN frame) received from the antenna 23 is stored. In step S2, the RF switch 24 is controlled to select the antenna 13 (referred to as a sub-antenna, in FIG. 4) of the mobile communication terminal 10 during the preamble period of the wireless LAN frame, and a received signal strength of a signal (the preamble part of the wireless LAN frame) received from the antenna 13 is stored.

Then, in step S3, the received signal strength of the antenna 23 and the received signal strength of the antenna 13 are compared. Then, when the received signal strength of the antenna 23 (main antenna) is greater, step S4 is carried out. In step S4, control is carried out such that the antenna 23 (main antenna) is selected by the RF switch 24. Thus, the header part and the data part (main frame) of the wireless LAN frame are received from the antenna 23. Then, in step S5, it is determined whether a transmission frame exists. When a transmission frame exists (YES in step S5), the transmission frame is transmitted from the antenna 23 (in step S6), and the series of steps starting from step S1 is carried out again.

On the other hand, when the received signal strength of the antenna 13 (sub-antenna) is greater in step S3, step S7 is carried out. In step S7, control is carried out such that the antenna 13 (sub-antenna) is selected by the RF switch 24. Thus, the header part and the data part (main frame) of the wireless LAN frame are received from the antenna 13. Then, in step S8, it is determined whether a transmission frame exists. When a transmission frame exists (YES in step S8), the transmission frame is transmitted from the antenna 13 (in step S9), and the series of steps starting from step S1 is carried out again.

It is noted that the above-described operation of the flowchart of FIG. 4 is carried out in a case where a user operates the mobile communication terminal 10 to select the wireless LAN using mode. Therefore, as mentioned above, the control part 16 of the mobile communication terminal 10 controls the RF switch 14 to cause the RF switch 14 to connect the antenna 13 with the RF switch 24 of the wireless LAN card 20 via the antenna terminal 22b. Therefore, in this case, by the above-mentioned control of step S7 of FIG. 4, wireless LAN communication (steps S7 and S9) by using the antenna 13 can be carried out.

Thus, in the embodiment of the present invention described above, one of the antenna 13 and the antenna 23, which one has the greater received signal strength, is selected to receive the header part and the data part of the wireless LAN frame. Therefore, in a case where sensitivity of the antenna 23 is degraded because a hand of a user, or the battery pack 11 or a substrate of the mobile communication terminal 10 covers the antenna 23 of the wireless LAN card 20, it is possible to use the antenna 13 of the mobile communication terminal 10 having satisfactory sensitivity to transmit and receive wireless LAN frames. Thus, it is possible to reduce degradation of antenna sensitivity.

<Diversity>

As mentioned above, the wireless LAN card 20 is loaded in the connector 12 of the mobile communication terminal 10. Therefore, depending on a actual position and an actual angle in which the connector 12 is provided in the mobile communication terminal 10, the relative positional relationship between (a spatial arrangement of) the antenna 23 of the wireless LAN card 20 and the antenna 13 of the mobile communication terminal 10 differs.

Figure 5:
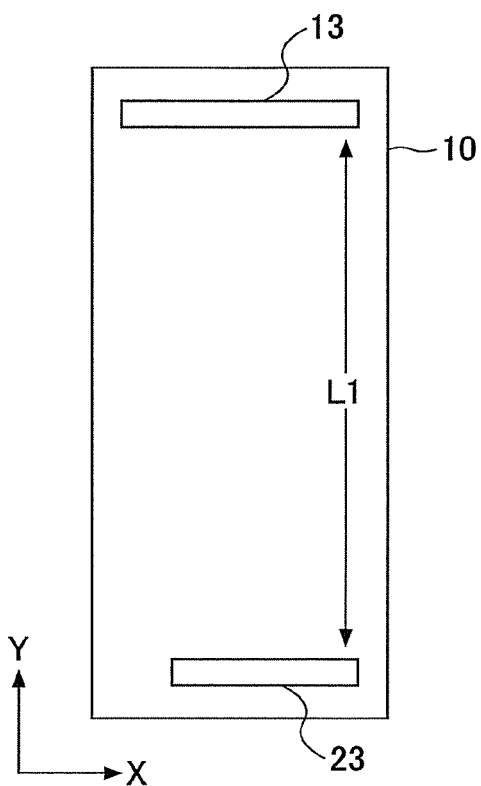
FIG. 5 schematically shows one example of relative positional relationship between (spatial arrangement of) antennas.
Figure 6:
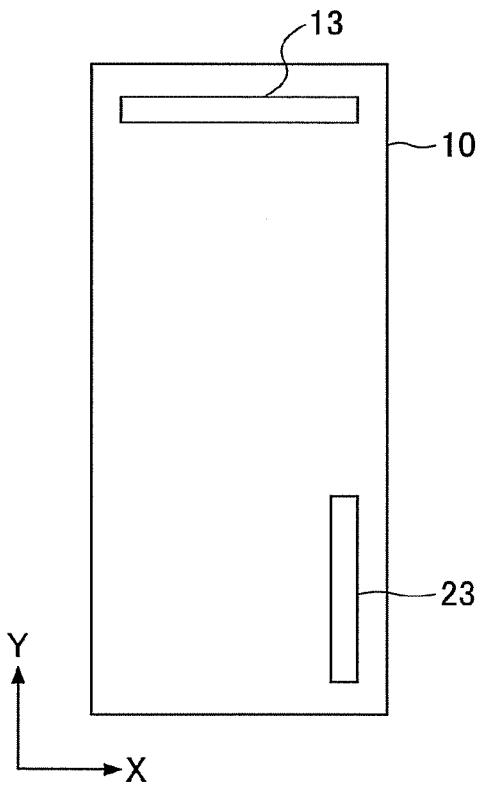
FIG. 6 schematically shows another example of relative positional relationship between (spatial arrangement of) antennas.

FIGS. 5 and 6 schematically show different relative positional relationships between (spatial arrangements of) the antenna 23 and the antenna 13, respectively. It is noted that, for the sake of convenience for explanation, in each of FIGS. 5 and 6, the antenna 23 is shown in a magnified manner in comparison to the antenna 13. In FIG. 5, respective longitudinal directions of the antenna 13 and the antenna 23 are both in an x-axis direction, and the antenna 13 and the antenna 23 are separated from one another by a distance L1. In this case, it is possible to achieve space diversity between the antenna 13 and the antenna 23 by carrying out the control of switching an antenna to be actually used between the antenna 13 and the antenna 23 described above with reference to FIG. 4 (flowchart). That is, a propagation path of a signal received from the antenna 13 is different from a propagation path of a signal received from the antenna 23 because of the above-mentioned distance L1. Therefore, a space diversity effect is expected by using the two antennas 13 and 23.

In FIG. 6, a longitudinal direction of the antenna 13 is an x-axis direction, while a longitudinal direction of the antenna 23 is a y-axis direction, and thus, the antennas 13 and 23 are orthogonal to one another. Therefore, assuming that the antenna 13 has a horizontal polarization, the antenna 23 has a vertical polarization. In this case, it is possible to achieve polarization diversity between the antenna 13 and the antenna 23 by carrying out the control of switching an antenna to be actually used between the antenna 13 and the antenna 23 described above with reference to FIG. 4 (flowchart).

By thus carrying out a space diversity method or a polarization diversity method, it is possible to reduce the influence of multipath.

Further, the present invention is not limited to the above-described embodiments, and variations and modifications may be made without departing from the basic concept of the present invention.

The present application is based on Japanese priority application No. 2009-166409, filed Jul. 15, 2009, the entire contents of which are hereby incorporated herein by reference.

What is claimed is:

1. A device that is loaded in a mobile communication terminal and is used for wireless communication, comprising:
   a first transmission and reception circuit that generates a transmission signal to be transmitted in a wireless manner based on transmission data, and processes a received signal that has been received in the wireless manner, the first transmission and reception circuit being connected to one of a first antenna and a second antenna in a switching manner through a first switch,
   wherein the first antenna is used for signal transmission and reception in the wireless manner,
   wherein the second antenna is provided to the mobile communication terminal outside of the device, and is connected to a second transmission and reception circuit different from the first transmission and reception circuit for a wireless communication, said second transmission and reception circuit being configured to transmit and receive a signal having a same frequency band as that of a signal that the first transmission and reception circuit transmits and receives, the mobile communication terminal including a second switch being configured to connect the second antenna to one of the first transmission and reception circuit of the device and the second transmission and reception circuit of the mobile communication terminal in a switching manner,
   wherein the first switch is controlled so as to select the first antenna during a preamble period of a wireless communication frame and a signal strength of a signal received from the first antenna is stored, and the first switch is subsequently controlled so as to select the second antenna during the preamble period of the wireless communication frame and a signal strength of a signal received from the second antenna is stored,
   wherein the device further comprises
   a control part that compares the received signal strength of the signal received by using the first antenna and the received signal strength of the signal received by using the second antenna, selects one of the first antenna and the second antenna, which one has a greater received signal strength, and causes the first switch to connect the first antenna to the first transmission and reception circuit when selecting the first antenna, and connect the second antenna to the first transmission and reception circuit when selecting the second antenna, and
   wherein the first transmission and reception circuit is configured to transmit a transmission frame from a selected antenna when the transmission frame exists.

2. The device as claimed in claim 1, wherein:
   in a condition in which the device is loaded in the mobile communication terminal, the first antenna and the second antenna have a spatial arrangement such that the control part carries out a space diversity method by using the first antenna and the second antenna.

3. The device as claimed in claim 1, wherein:
   in a condition in which the device is loaded in the mobile communication terminal, the first antenna and the second antenna have a spatial arrangement such that the control part carries out a polarization diversity method by using the first antenna and the second antenna.

4. A mobile communication terminal, in which a device that is used for wireless communication of transmitting and receiving a signal having a frequency band is loaded, comprising:
   a second transmission and reception circuit that generates a transmission signal to be transmitted in a wireless manner based on transmission data, and processes a received signal that has been received in the wireless manner;
   a second antenna that is used for transmitting and receiving a signal having the frequency band in the wireless manner; and
   a second switch that connects the second antenna to one of a first transmission and reception circuit of the device and the second transmission and reception circuit of the mobile communication terminal in a switching manner, said second transmission and reception circuit being configured to transmit and receive a signal having a same frequency band as that of a signal that the first transmission and reception circuit transmits and receives,
   wherein the first transmission and reception circuit is connected to one of a first antenna and the second antenna in a switching manner through a first switch,
   wherein the first antenna is used for signal transmission and reception in the wireless manner, wherein the first switch is controlled so as to select the first antenna during a preamble period of a wireless communication frame and a signal strength of a signal received from the first antenna is stored, and the first switch is subsequently controlled so as to select the second antenna during the preamble period of the wireless communication frame and a signal strength of a signal received from the second antenna is stored,
   wherein the device includes a control part that compares the received signal strength of the signal received by using the first antenna and the received signal strength of the signal received by using the second antenna, selects one of the first antenna and the second antenna, which one has a greater received signal strength, and causes the first switch to connect the first antenna to the first transmission and reception circuit when selecting the first antenna, and connect the second antenna to the first transmission and reception circuit when selecting the second antenna, and
   wherein the first transmission and reception circuit is configured to transmit a transmission frame from a selected antenna when the transmission frame exists.

5. The mobile communication terminal as claimed in claim 4, wherein:
   the second switch carries out a switching operation to connect the second antenna to, in the switching manner, one of the first antenna of the device and the second transmission and reception circuit of the mobile communication terminal, according to a selecting operation carried out by a user.

6. The mobile communication terminal as claimed in claim 4, wherein the first antenna has a longitudinal direction orthogonal to that of the second antenna so as to achieve a polarization diversity.

* * * * *